United States Patent [19]
Klinkhammer

[11] Patent Number: 5,531,582
[45] Date of Patent: Jul. 2, 1996

[54] APPARATUS FOR INJECTION MOLDING A PLASTIC MONOLITH

[75] Inventor: Ronald W. Klinkhammer, Seattle, Wash.

[73] Assignee: Oral Logic, Inc., Minot, N. Dak.

[21] Appl. No.: 342,706

[22] Filed: Nov. 21, 1994

Related U.S. Application Data

[60] Division of Ser. No. 989,125, Dec. 11, 1992, abandoned, which is a continuation-in-part of Ser. No. 499,022, Mar. 26, 1990, Pat. No. 5,171,066, and a continuation-in-part of Ser. No. 924,099, Aug. 3, 1992, Pat. No. 5,316,027.

[51] Int. Cl.$^6$ .................................................. B29C 45/34
[52] U.S. Cl. ........................... 425/190; 264/243; 249/141; 425/546; 425/588; 425/805; 425/812
[58] Field of Search ............................ 425/546, 812, 425/805, 190, 420, 556, 588; 249/141; 264/243

[56] References Cited

U.S. PATENT DOCUMENTS

| | | | |
|---|---|---|---|
| 2,621,369 | 12/1952 | Gantz et al. | 264/243 |
| 2,651,810 | 9/1953 | Snyder | 425/805 |
| 2,976,571 | 3/1961 | Moslo | 425/812 |
| 3,781,402 | 12/1973 | Hanggi et al. | 425/805 |
| 3,810,599 | 5/1974 | Fornari | 425/805 |
| 3,951,580 | 4/1976 | Hobson | 425/812 |
| 4,422,986 | 12/1983 | Cole | 264/39 |
| 4,479,914 | 10/1984 | Baumsucker | 425/546 |
| 4,666,323 | 5/1987 | Kessler | 425/805 |
| 4,712,936 | 12/1987 | Kessler | 425/805 |
| 4,797,236 | 1/1989 | Kojima | 425/546 |

Primary Examiner—Khanh P. Nguyen
Attorney, Agent, or Firm—Christopher Duffy

[57] ABSTRACT

The monolith includes a base of plastic resin material having elongated bristles of the same resin material monolithically relatively upstanding on one side thereof so that the monolith can be used as a brush. The base of the monolith is molded in a cavity having branches thereof in which the bristles are formed. The bristles are formed to have shank portions relatively upstanding from the one side of the base to points on the longitudinal axes of the bristles relatively intermediate between the one side of the base and the tips of the bristles, and tip portions extending relatively outwardly along the axes of the bristles from the intermediate points to the tips of the bristles. And in forming the respective bristles, plastic resin material which was injected into the cavity and the branches in turn, is encountered by a plate across the distal ends of the branches, at which the gas displaced into the branches from the cavity discharges to atmosphere, relatively laterally of the branches, while dimples in the plate operate to round off the tips of the bristles formed therein. Meanwhile, the circumferential walls of the branches taper toward the distal ends thereof from planes coinciding with the intermediate points of the bristles, so that the bristles relatively slideably disengage from the branches when the mold is opened and the monolith is relatively retracted from that member of the mold defining the branches.

15 Claims, 4 Drawing Sheets

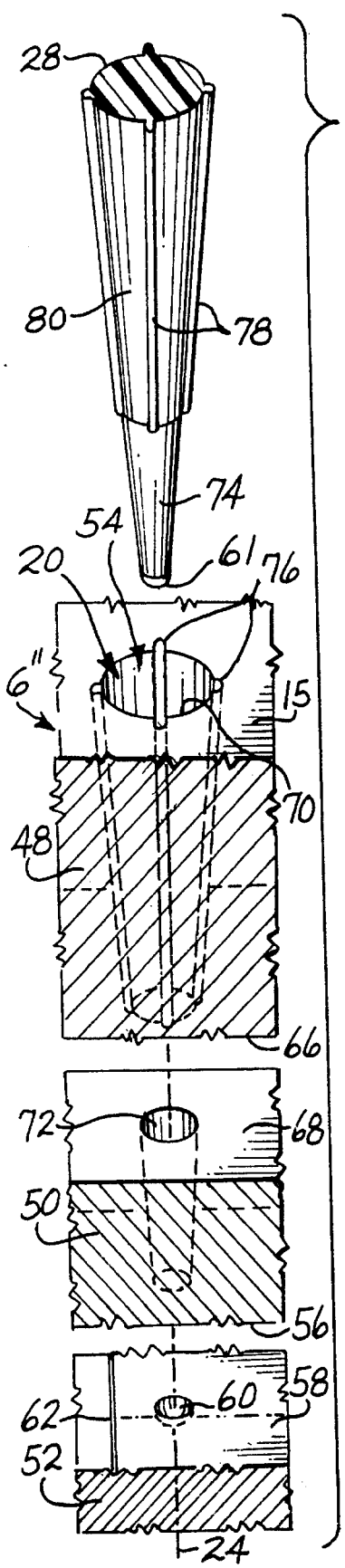
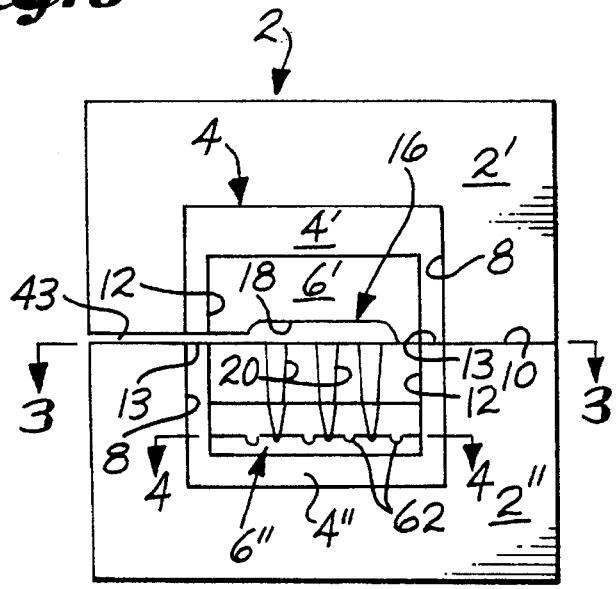
Fig.1
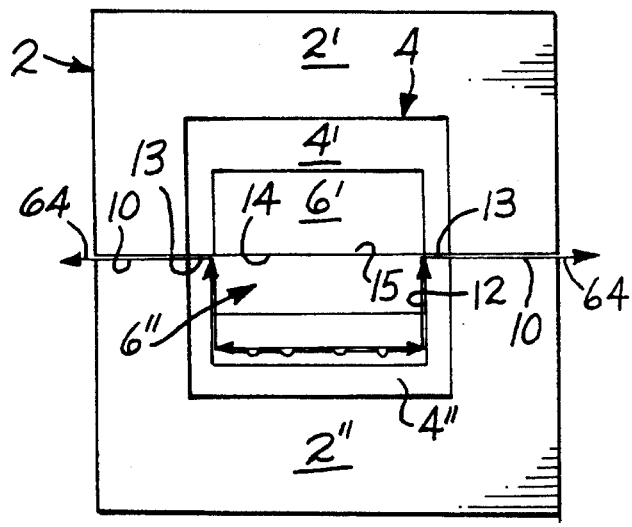
Fig.2

APPARATUS FOR INJECTION MOLDING A PLASTIC MONOLITH

RELATED APPLICATIONS

The present application is a Division of application Ser. No. 07/989,125, filed Dec. 11, 1992, under the title APPARATUS AND TECHNIQUE FOR INJECTION MOLDING A PLASTIC MONOLITH, now abandoned, which in turn was a Continuation in Part of application Ser. No. 07/499,022, filed on Mar. 26, 1990 and entitled TOOTH CLEANING DEVICE AND METHOD FOR MAKING THE SAME, now U.S. Pat. No. 5,171,066. Application Ser. No. 07/989,125 was also a Continuation in Part of application Ser. No. 07/924,099, filed on Aug. 3, 1992 and entitled STRADDLE TYPE TOOTH BRUSHING DEVICE, now U.S. Pat. No. 5,316,027.

Both applications relate to straddle type tooth brushes, although in application Ser. No. 07/499,022, the gripper elements were flexibly interconnected by an articulated linkage therebetween, while in application Ser. No. 07/924,099 the gripper elements were independent on one another on the outboard end portions of the arms. The present apparatus is nevertheless applicable to the molding of each by the injection molding process, since the gripper elements of each constitute plastic monoliths of the type described.

TECHNICAL FIELD

This invention relates to an apparatus and technique for molding a plastic monolith by the injection molding process, and in particular, a plastic monolith comprised of a base of plastic resin material having elongated bristles of the same resin material monolithically relatively upstanding on one side thereof so that the monolith can be used as a brush. The apparatus and technique are particularly applicable to the injection molding of a tooth cleaning head for the arm of a toothbrush, and especially the wing-like gripper elements for the arms of a straddle type toothbrush.

BACKGROUND OF THE INVENTION

In application Ser. No. 07/499,022, an apparatus and technique were disclosed wherein a mass of plastic resin material was injected into a mold cavity which was defined by the mutually opposing faces of a pair of relatively reciprocable members on opposing sides of a plane of the mold, and had a cross section corresponding to the body of the base of the monolith to be molded. In addition, one of the mold cavity defining members had a set of elongated bristle defining branches of the cavity formed therein, which extended from the face of the one mold cavity defining member along longitudinal axes transverse the plane of the mold and terminated at the ends thereof relatively remote from the face of the one mold cavity defining member. When the gas in the cavity was displaced into the branches by the resin material, the gas was discharged in turn to a low pressure zone at the terminal ends of the branches so as to make way for the formation of the bristles of the monolith therein. Moreover, when in certain embodiments of the apparatus and technique, a substrate with a substantially planar face was enclosed in the cavity so that the face thereof was spaced apart from the face of the one mold cavity defining member, the mass of resin material was injected into the space between the faces of the substrate and the one mold cavity defining member to form a plastic monolith adapted as a bristle supporting overlay for the substrate. In fact, in some embodiments, the substrate was secured to the plastic monolith to form a backing therefor, for example, by interposing spacer elements between the substrate and the faces of the mold cavity defining members on the opposing sides of the plane of the mold to substantially surround the substrate with an unoccupied portion of the cavity, into which the mass of plastic resin material was injected to substantially encircle the substrate with resin material in forming the base of the monolith. To form the gripper elements themselves, the outboard end portions of the arms of the brush were enclosed in a pair of mold cavities corresponding to the bodies of the elements, and spacer elements were interposed between the outboard end portions of the arms and the faces of the members to substantially surround the end portions of the arms with unoccupied portions of the cavities. A mass of the resin material was injected into the unoccupied portions of the cavities to substantially encircle the outboard end portions of the arms with the resin material, and when the gas in the cavities was displaced into the branches by the resin material, the gas discharged from the branches at the terminal ends thereof to enable the bristles to form on the bases of the gripper elements. Additionally, to provide an articulated linkage between the gripper elements, the faces of the pair of mold cavities defining members were given a series of serially interconnected cavities having cross sections corresponding to the bodies of the gripper elements and the linkage therebetween, and the mass of resin material was injected into the series of cavities to form a monolith which was referred to as a "cowling," since when the brush was put to use, the monolith was reentrantly folded about the arms to form a taco shell shaped head which could be straddled about a row of teeth and translated along the length of the row while the gripper elements were applied to the outside and inside faces of the teeth to clean them.

The apparatus and technique of application Ser. No. 07/499,022 have proven to be highly satisfactory in making straddle type brushes of the type shown in application Ser. No. 07/499,022, and application Ser. No. 07/924,099, but the molds for the same have also proven to be expensive to manufacture, and therefore, a way has been sought to reduce the expense of the mold, and particularly, the expense of the mold cavity defining member having the bristle forming branches therein.

THE INVENTION IN GENERAL

I have discovered a way not only to reduce the cost of the mold, but also to gain a number of other advantages in the manufacture of the monolith, and in the character of the monolith itself. According to the present invention, I now close the terminal ends of the branches at the longitudinal axes thereof, and form a fluid flow path for gas in the one mold cavity defining member, which opens into the respective branches adjacent the terminal ends thereof, but discharges transverse the axes of the branches to a low pressure zone spaced apart from the branches so that the gas in the cavity need not discharge at the terminal ends of the branches any longer. This not only makes it possible to reduce the cost of the mold, as shall be explained, but also to round-off the terminal ends of the branches at the axes thereof so that the tips of the bristle formed therein are rounded. It also makes it possible to vary the cross sections of the shank portions of the respective bristles, relative to the tip portions of the respective bristles, and vice versa, either transverse the axes of the branches, and/or in planes coincident with the axes of the branches. Furthermore, it makes it possible to vary the diameters of the branches from one branch to another at the face of the one mold cavity defining member.

In certain presently preferred embodiments of the invention, the fluid flow path for gas is formed by subdividing the one mold cavity defining member into a pair of plate-like members which are juxtaposed to one another substantially on parallels to the plane of the mold to form a joint therebetween, and spacing apart the faces of the plate-like members which are mutually opposed to one another across the joint to form slit-like fluid flow annuli about the respective branches which discharge to a low pressure zone opening at the outer periphery of the one mold cavity defining member. In some embodiments, the mutually opposing faces of the plate-like members are abutted with one another at the joint to form the annuli, and one of the faces of the plate-like members is scored to form a low pressure zone in the joint which discharges at the outer periphery thereof. Preferably, the plate-like member relatively adjacent the cavity is given a gallery of holes therein on axes transverse the plane of the mold to form the branches, and the face of the plate-like member relatively remote from the cavity, is dimpled at the longitudinal axes of the holes, to round-off the tips of the bristles formed therein.

To reduce the cost of the mold, the branches themselves are formed by subdividing the one mold cavity defining member into a pair of plate-like members which are juxtaposed to one another substantially on parallels to the plane of the mold to form a joint therebetween, and giving the plate-like members galleries of holes therein which are aligned with one another on axes transverse the plane of the mold to form the branches. Then, as additional advantages and given these two galleries of holes, the cross sections of the respective galleries of holes can be varied from one plate-like member to the other to vary the cross sections of the shank portions and the tip portions of the respective bristles formed on the opposing sides of the joint between the pair of plate-like members. This includes varying the cross sections of the respective portions transverse the axes of the branches from one side of the joint to the other; and/or varying the cross sections of the respective portions in planes coincident with the axes of the branches.

Moreover, given the relative ease with which the galleries of holes can be formed in the plate-like members, the diameters of the holes in the respective galleries of holes can be varied from hole to hole, including varying the diameters of the holes in the plate-like member relatively adjacent the cavity, at the face of the one mold cavity defining member, and varying the diameters of the holes in the plate-like member relatively remote from the cavity, at the joint between the plate-like members.

As before, a substrate may be enclosed in the cavity and a bristle supporting plastic overlay for the substrate may be formed between the face of it and the face of the one mold cavity defining member. Also, if desired, the substrate may be secured to the overlay to form a backing therefor; and in addition, the apparatus and technique may be used to form gripper elements on the outboard end portions of the arms of a straddle type brush, as well as a full cowling on the outboard end portions of the arms, as was done in application Ser. No. 499,022.

BRIEF DESCRIPTION OF THE DRAWINGS

These features will be better understood by reference to the accompanying drawings wherein I have illustrated a presently preferred embodiment of the invention as it is applied to the injection molding of such a cowling. However, because of duplication in the molding of each gripper element, and repetition in the molding of the articulated linkage between the gripper elements from application Ser. No. 499,022, only that portion of the mold for the formation of one gripper element is shown in vertical cross section.

In the drawings:

FIG. 1 is a vertical cross sectional schematic of that portion of the mold;

FIG. 2 is a further vertical cross sectional schematic of that portion of the mold, illustrating the fluid flow path by which the gas discharges from the cavity of the mold;

FIG. 6 is an exploded part perspective view of the mold at a bristle forming branch of the cavity, as well as a part perspective view of he strand of bristle formed in the same;

BRIEF MODE FOR CARRYING OUT THE INVENTION

Figure 3:
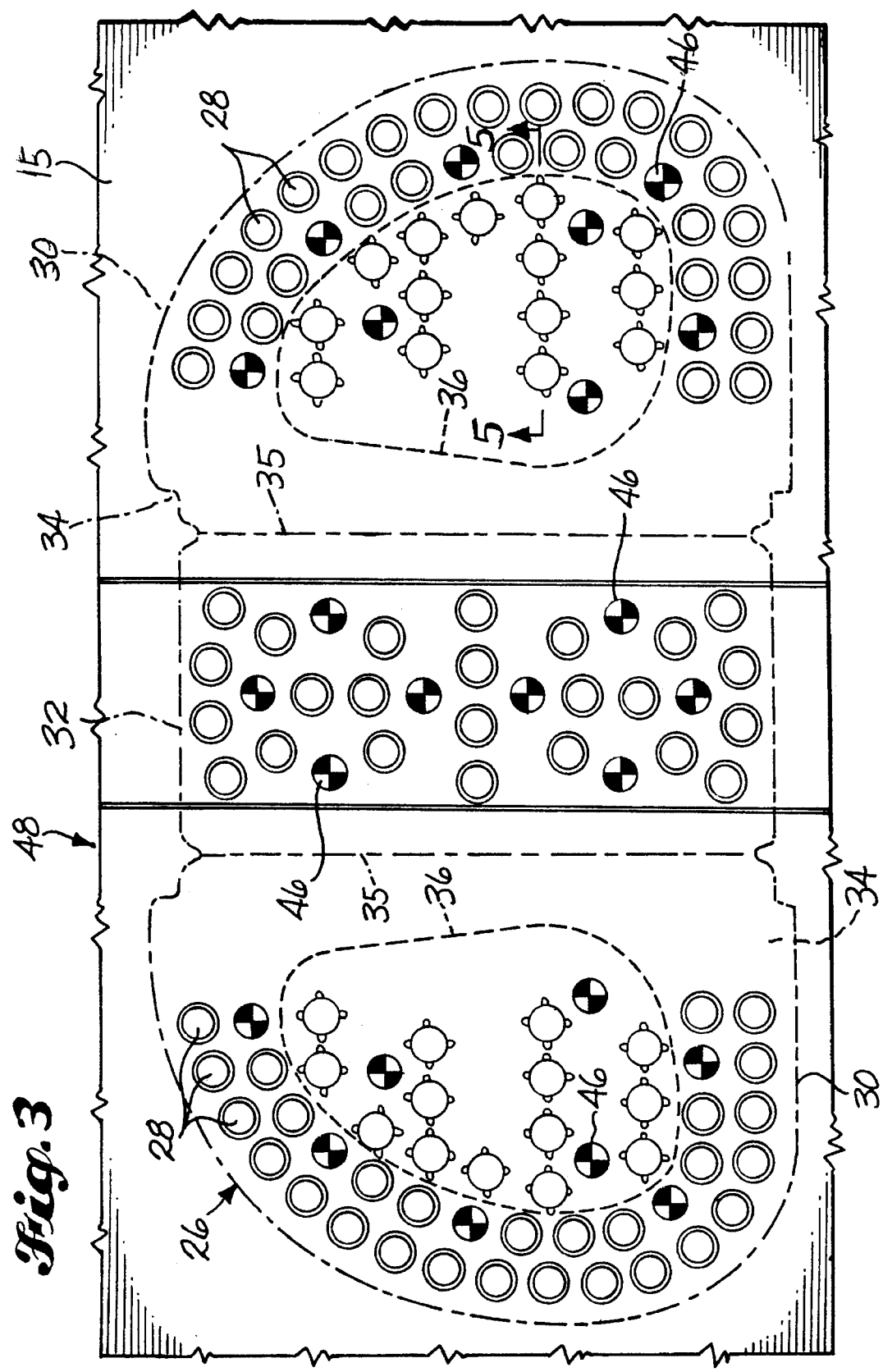
FIG. 3 is a cross sectional view of the mold along the line 3—3 of FIG. 1.

Referring to the drawings, it will be seen that the mold has an outer case 2, a block-like lining 4 therewithin, and a pair of heat conductive inserts 6', 6" enclosed within the lining. The case 2 is box-like and comprises a pair of relatively upper and lower casing members 2', 2" which have corresponding quadrilateral recesses 8 in the opposing faces 10 thereof, that register with one another to form an oversized cavity within the case when the members 2', 2" are superposed on one another as shown. In practice, the casing members are mounted on a pair of opposing platens (not shown), the upper of which is reciprocable in relation to the lower platen, so that the two casing members can be parted from one another at the plane of their faces 10 when it is time to remove the molded product from the mold. The lining 4 is adapted to fill the cavity of the case 2 and comprises a pair of relatively upper and lower intermediate members 4', 4" which have quadrilateral recesses 12 in the opposing faces 13 thereof that form a smaller cavity when the members are superposed on one another in the cavity of the case as shown. The intermediate members of the lining are captive within the respective recesses 8 of the casing members, and when superposed on one another, are flush with the faces 10 of the casing members in the plane thereof. The inserts 6', 6", meanwhile, are captive within the respective recesses 12 of the lining to more loosely fill the cavity thereof, and to assume a coplanar condition with the faces 10, 13 of the members 2', 2 and 4', 4" at the plane thereof when the case 2 is closed in the molding operation The inserts 6', 6" also have a cross section corresponding to the body of the cowling 22 to be molded in the mold, although the main hollow 18 of the cavity 16 for this purpose is defined by the relatively upper insert 6', while the relatively lower insert 6" has the sets of elongated bristle defining branches 20 for the wings 30 of the cowling. As seen, the branches 20 extend from the face 15 of the relatively lower insert 6" along longitudinal axes 24 transverse the plane of the faces 10, 13 of the respective upper and lower mold assemblies, and terminate at the ends thereof relatively remote from the face 15 of the relatively lower insert.

The branches 20 in turn have walls circumposed about the longitudinal axes 24 thereof which have transverse cross sections of predetermined diameters adjacent the face 15 of the relatively lower insert 6", to form the shank portions 80 of the respective bristles 28, but which are tapered in the direction relatively axially inwardly of the longitudinal axes 24 of the respective branches at the terminal end portions of the respective branches, so as to coterminate with the relatively remote ends 60 of the respective branches at relatively axially inwardly directed corners therebetween which have transverse cross sections of reduced diameter relative to the shank-forming portions of the respective branches, so that the tip portions 74 of the respective bristles 28 readily extract from the branches when the inserts 6' and 6" are reciprocated relatively away from one another in the opening of the mold.

Figure 4:
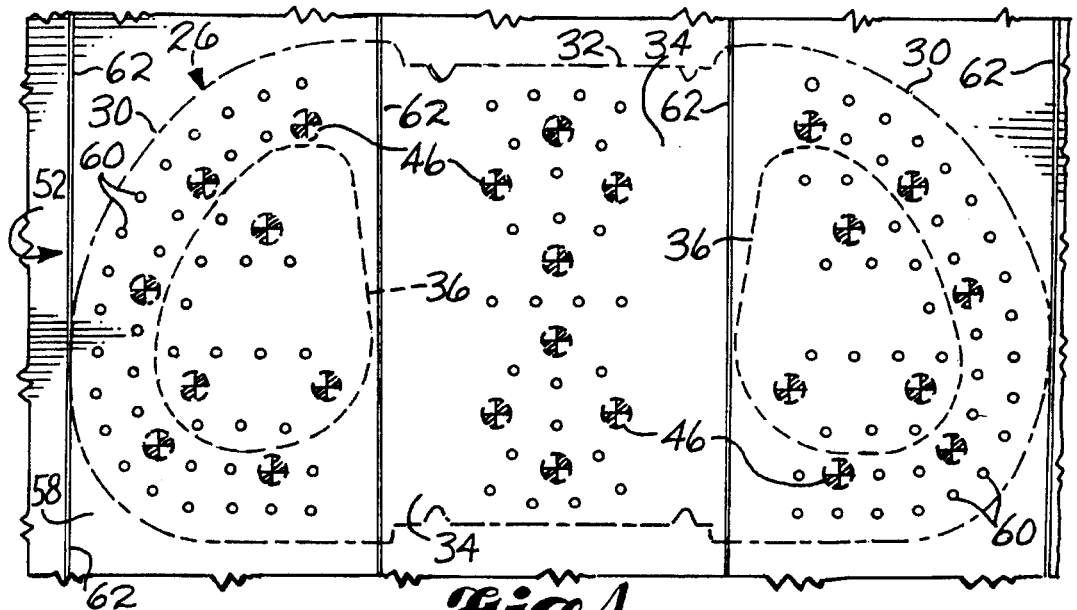
FIG. 4 is a cross sectional view of the mold along the line 4—4 of FIG. 1.

The outline 26 of the cowling 22 can be seen in FIGS. 3 and 4, and as in the past, the cowling comprises a sheet of reentrantly foldable plastic resin material having fields of bristle 28 upstanding on the wings 30 thereof, at corresponding sides of the cowling, as well as a third field of bristle 28 upstanding on the midsection 32 thereof, on the same side of the cowling. The cowling also has added portions 34 between each of the wings and the midsection thereof, which provide fold lines 35 at which the cowling can be reentrantly folded into a taco shell shaped configuration.

In the molding operation, the cowling 22 is molded in the flat, as seen in FIGS. 3 and 4, and in addition, as before, is molded about the jaws or other outboard end portions 36 of a pair of spaced generally parallel arms (not shown) that are operatively disposed at the head of the toothbrush, with an elongated slot (not shown) extending therebetween. Reference should be made to the earlier filed Applications, however, for these and other details of the toothbrush itself, and the general molding procedure, including the resins used. In the drawings hereof, only a cross section of one arm at the outboard end portion 36 thereof, is shown in the cross sections of the mold.

Prior to the molding operation, the outboard end portions of the arms are positioned in the plane 10, 13 of the cavity 16 and are enclosed within the cavity, with sets of studs 38 upstanding on the opposing sides 40 thereof to form spacer elements between the faces 14, 15 of the inserts and the adjacent sides 40 of the outboard end portions of the arms. When plastic resin material 42 is injected into the mold through an inlet or runner 43 from the sprue (not shown) of the injection molding machine, at the plane of the faces, the resin material occupies the open portions 44 of the cavity between the faces of the inserts and the adjacent sides 40 of the outboard end portions 36 of the arms, and substantially encircles the outboard end portions of the arms to secure the resulting plastic monolith to the arms. Then, when the mold assemblies have been parted, ejector pins 46 in the lower insert 6" are extended toward the upper assembly to eject the monolith and arms from the lower insert.

In accordance with the invention, the lower insert 6" comprises a stack of three flat rectangular plates 48, 50, 52 which are bolted (not shown) or otherwise clamped together and mounted in the recess 12 of the lower member 4" of the lining to form the lower insert. The uppermost and intermediate plates 48, 50 of the stack have a gallery of holes 54 therethrough on the vertical axes 24 of the branches, and the holes open into the upper face 15 of the uppermost plate and the lower face 56 of the intermediate plate. Meanwhile, the lowermost plate 52 is closed at the upper face 58 thereof, and though abutted with the lower face 56 of the intermediate plate, forms slit-like fluid flow annuli 56, 58 about the respective holes 54 at the joint between the faces. The annuli open to the outer periphery 12 of the joint and enable the gas in the cavity 16 to discharge from the branches 20. But to assure that the gas will discharge at a rate adapted to enable the resin 42 to charge into the branches for the formation of the bristle 28 therein, yet not enter the annuli 56, 58 of the joint, because of the back pressure of the gas therein, a limited number of grooves 62 is provided in the face 58 of the lowermost plate 52 to form a low pressure zone between the annuli and the outer periphery of the joint. The number, size and location of the grooves 62 is such that the back pressure in the annuli always exceeds the flash point of the resin under the temperature and pressure at which the resin is introduced to the mold. Yet ideally, the grooves are also present in sufficient number, size and location to enable the resin to charge through the open portions of the cavity and into the branches, at the optimum fill time for the resin in such an operation. The balance between the two factors is readily determined by conventional empirical or analytical methods.

Commonly, the lower insert is also sufficiently loosely seated in the recess 12 of the lower member 4" of the lining that the gas discharging at the outside ends of the grooves 62 readily discharges upwardly to the plane of the faces 10, 13, where the two mold assemblies 2, 4 always have sufficient an annulus therebetween to enable the gas to readily escape, as indicated by the arrows 64.

The gas also tends to discharge to a more limited extent at the joint between the lower and upper faces 66 and 68 of the uppermost and intermediate plates, and thence in the same path as that taken by the gas discharging at the joint 56, 58 between the intermediate and bottommost plates.

Meanwhile, to round off the tips of the bristles 28, the upper surface 58 of the bottommost plate 52 has a series of dimples 60 therein at the axes 24 of the holes 54, which are substantially hemispherical to give the tips 61 of the bristles a similar outline.

Figure 5:
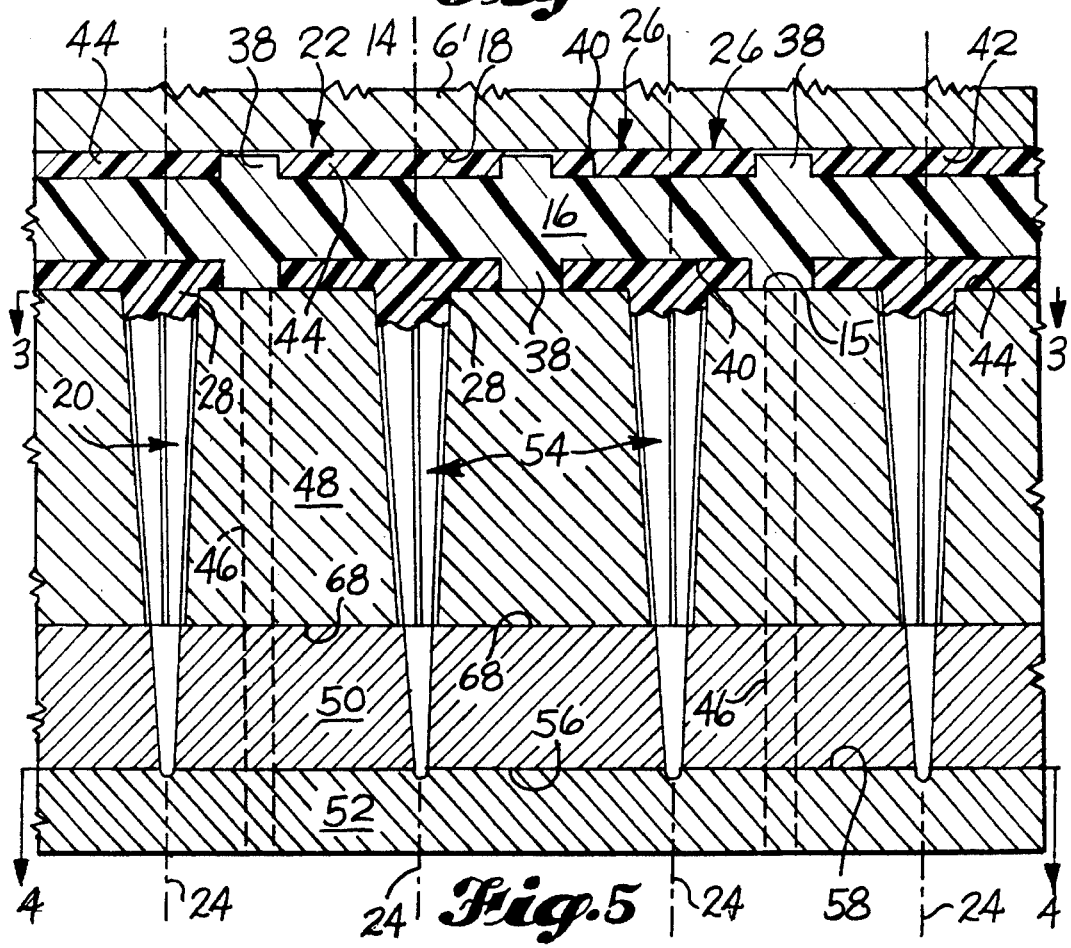
FIG. 5 is a cross sectional view of the mold along the line 5—5 of FIG. 3.

As indicated earlier, by subdividing the lower insert 6" into a plurality of plates, the insert is far cheaper to make; and in addition, the respective galleries of holes 70 and 72 in the uppermost and intermediate plates, which form the gallery of holes 54 defining the branches of the cavity, can be given differing cross sections and diameters, from hole to hole within a plate, and/or differing diameters and cross sections from plate to plate. In FIGS. 5 and 6, the holes of the respective plates have a common taper from the top of the insert to the bottom of the intermediate plate, and the taper is adapted so that the tip portions 74 of the bristles are adapted to reach into the sulcus of the teeth when the brush is put to use. However, the holes 70 in the uppermost plate 48 have fluting 76 symmetrically spaced thereabout to form ribs 78 on the shank portions 80 of the bristles that will, meanwhile, give the bristles strength and rigidity. See FIG. 6.

Commonly, bristles with such ribs 78 thereon, are employed in the center regions of the fields of bristle on the wings 30 of the cowling, while bristles without ribs, are employed around the perimeter of the wings, as seen in FIG. 3 wherein symbols of appropriate outline are used for the respective ribbed and unribbed bristles. Of course, as explained in application Ser. No. 924,099, it is the peripheral areas of the wings which form the relatively flaccid lobes of the gripper elements, and therefore, the bristles in these areas are preferably more flexible and more readily deformable than those overlaid on the jaws 36 of the arms.

Figure 7:
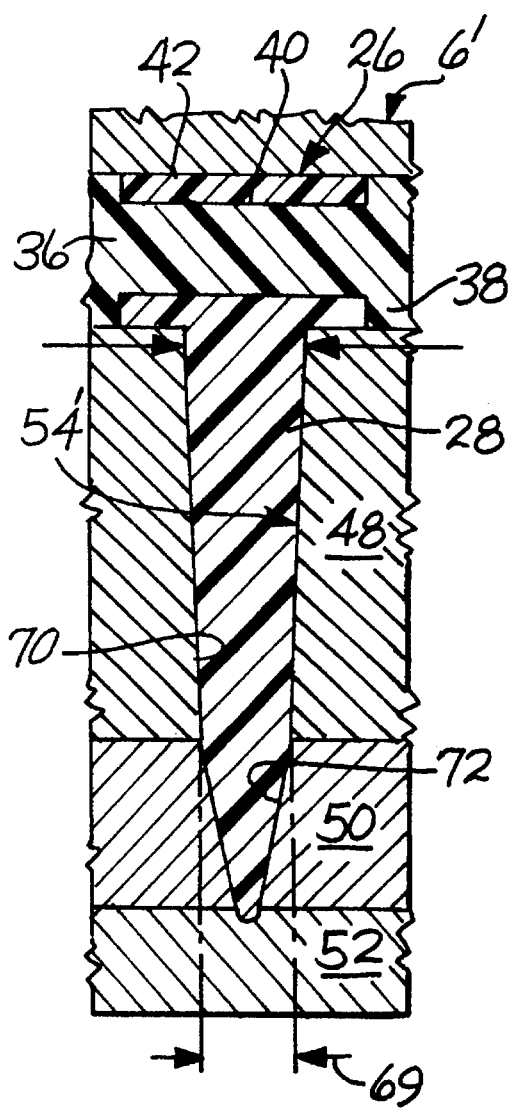
FIG. 7 is a cross sectional view of an alternative bristle forming branch when the diameters of the branches are varied from branch to branch.
Figure 8:
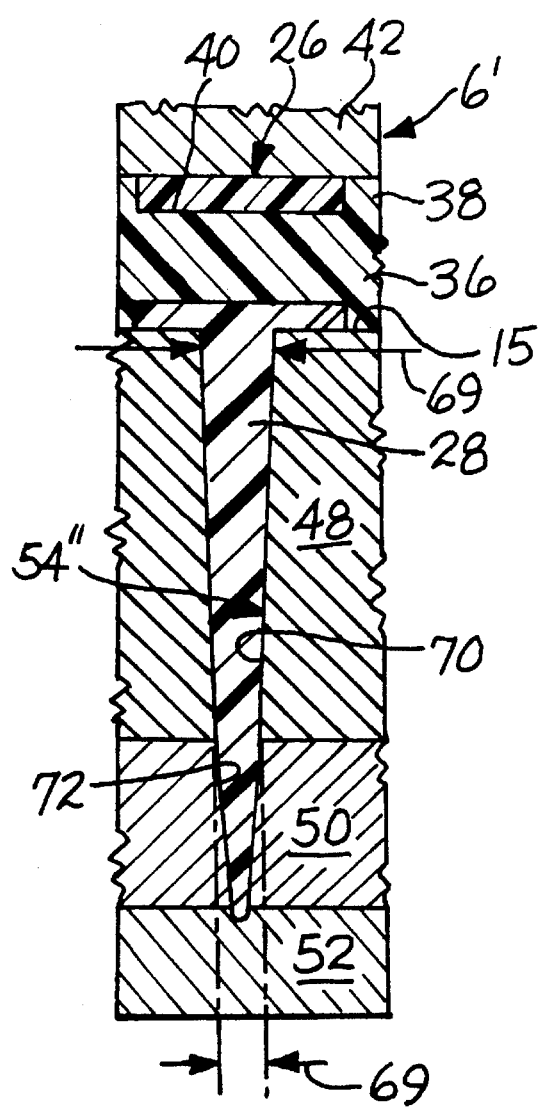
FIG. 8 is another cross sectional view of such a branch when the diameters of the branches are so varied from branch to branch.

In FIGS. 7 and 8, a similar effect is achieved by varying the diameters of the holes 70 in the uppermost plate 48. In FIG. 7, certain holes 70 in the uppermost plate 48 are considerably greater in diameter at the face 15 of the insert 6", than those seen in FIG. 8. Compare the widths represented by the arrows 69. In addition, the holes 72 in the intermediate plate 50 have a steeper taper in FIG. 7 than those in FIG. 8. The greater diameter, steeper tipped branch forming holes 54' of FIG. 7 are used in the central regions of the wings 30, while the smaller diameter, flatter tipped holes 54" of FIG. 8 are used in the peripheral areas.

Though any one of several conventional techniques such as chemical etching can be employed to form the holes 70, 72 and the various cross sections thereof, it is preferred to form them with an electric discharge machine, starting by forming pilot holes on the axes of the branches 20, and then using rotating wires to give the respective holes the desired taper and diameter, or selectively applied wires to form the sets of flutes 76 about the holes 70 in the uppermost plate. Commonly, each operation is computer driven, and together they are far less expensive than fashioning the lower insert from a single solid piece.

Certain metal alloys are also preferred for the respective plates. Copper beryllium alloys dissipate heat best, but hardened stainless steels have a higher durometer than copper beryllium alloys.

I claim:

1. In apparatus for injection molding a plastic monolith comprised of a base of plastic resin material having elongated bristles of the same resin material monolithically relatively upstanding on one side thereof so that the monolith can be used as a brush, the bristles having longitudinal axes relatively transverse the one side of the base, tips spaced apart from the one side of the base along the axes, shank portions relatively upstanding along the axes to points thereon relatively intermediate between the one side of the base and the tips of the bristles, and tip portions extending relatively outwardly along the axes of the bristles from the intermediate points thereon to the tips of the respective bristles, a mold comprised of a pair of relatively reciprocable members which are disposed on opposite sides of a plane of the mold and have mutually opposing faces thereon which are operable to define a mold cavity having a cross section corresponding to the base of the monolith when the faces of the members are abutted with one another at the plane of the mold, one of the mold cavity defining members having a set of elongated bristle defining branches of the cavity located therein, which extend relatively inwardly of the one mold cavity defining member from the face thereof along longitudinal axes transverse the plane of the mold, the branches of the cavity having relatively proximal and distal ends disposed transverse the respective axes thereof at the face of the one mold cavity defining member and at points spaced apart from the face of the one mold cavity defining member, respectively, and annular walls circumposed about the respective axes thereof in the space between the relatively proximal and distal ends of the respective branches, the branches having cross sections at the inner peripheries of the walls in planes transverse the axes of the respective branches, including cross sections in spaced first and second planes coinciding with the intermediate points on the axes of the bristles and with the relatively distal ends of the branches, respectively, adapted so that the branches are operable to form the shank and tip portions of the respective bristles, means for injecting a mass of plastic resin material into the mold cavity, and in turn into the respective branches thereof through the relatively proximal ends of the branches, means disposed at the distal ends of the respective branches to close the distal ends to the flow of resin material therethrough, and means disposed about the walls of the respective branches in the space between the respective first and second cross sectional planes of the branches, to discharge gas displaced into the respective branches from the cavity when the plastic resin material occupies the branches through the relatively proximal ends thereof, the closure means forming end walls for the relatively distal ends of the branches having cross sectional areas in planes transverse the axes of the branches no greater than the cross sectional areas of the distal ends of the branches in said second cross sectional planes thereof, and the annular walls of the respective branches having cross sections in planes coinciding with the axes of the respective branches that taper along straight lines relatively inwardly of the axes of the respective branches in the direction relatively axially inwardly of the one mold cavity defining member from the face thereof, relatively from the first cross sectional planes of the respective branches to the second cross sectional planes of the respective branches, so that the branches and the respective bristles formed therein relatively slideably disengage from one another when the mold cavity defining members are reciprocated in relation to one another to open the mold and the monolith is relatively retracted from the face of the one mold cavity defining member to remove the bristles therefrom.

2. The injection molding apparatus according to claim 1 wherein the end walls for the relatively distal ends of the branches are dimpled within the cross sectional areas thereof to round off the tips of the respective bristles.

3. The injection molding apparatus according to claim 1 wherein the proximal ends of the branches are spaced apart from one another along the face of the one mold cavity defining member.

4. The injection molding apparatus according to claim 1 wherein the proximal ends of the branches have differing cross sections in planes transverse the axes thereof.

5. The injection molding apparatus according to claim 1 wherein the proximal ends of the branches have differing diameters in planes transverse the axes thereof.

6. The injection molding apparatus according to claim 1 wherein the cross sections of the annular walls of the branches in planes coinciding with the axes of the respective branches, also taper along straight lines relatively inwardly of the axes of the respective branches in the direction relatively axially inwardly of the one mold cavity defining member from the face thereof, between the face of the one mold cavity defining member and the first cross sectional planes of the respective branches transverse the axes thereof.

7. The injection molding apparatus according to claim 6 wherein the cross sections of the annular walls of the branches in planes coinciding with the axes of the respective branches, taper relatively inwardly of the axes of the respective branches at differing angles to the axes between the face of the one mold cavity defining member and the first cross sectional planes of the respective branches transverse the axes thereof, and between the first and second cross sectional planes transverse the axes of the respective branches, respectively.

8. The injection molding apparatus according to claim 1 wherein the one mold cavity defining member has an outer periphery circumposed thereabout at the outside thereof, and the gas discharge means include means defining a low pressure zone which opens to the outside of the one mold cavity defining member at the outer periphery thereof, and means forming annular slits which are circumposed about the annular walls of the respective branches for the discharge of the gas to the low pressure zone.

9. The injection molding apparatus according to claim 8 wherein the low pressure zone is defined by the one mold cavity defining member.

10. The injection molding apparatus according to claim 8 wherein the one mold cavity defining member comprises a pair of casing members which are juxtaposed to one another along parallels to the plane of the mold and have mutually opposing faces thereon which are abutted with one another to form a joint therebetween, and wherein one of the casing members has a gallery of holes therethrough which extend along axes perpendicular to the face of the one mold cavity defining member, and the annular slits are formed about the respective holes at the joint between the mutually opposing faces of the respective casing members.

11. The injection molding apparatus according to claim 10 wherein the joint coincides with the second cross sectional planes of the branches transverse the axes thereof, and the face of the other casing member is closed at the distal ends of the respective branches so as to form the end walls for the relatively distal ends of the respective branches at the joint.

12. The injection molding apparatus according to claim 11 wherein the joint discharges to atmosphere at the outer periphery of the one mold cavity defining member, and one of the faces of the respective casing members is scored to form a low pressure zone in the joint.

13. The injection molding apparatus according to claim 10 wherein the one casing member comprises a pair of plates which are juxtaposed to one another along parallels to the plane of the mold and have mutually opposing faces thereon which are abutted with one another to form a joint therebetween at the first cross sectional planes of the branches transverse the axes thereof, and wherein the plates have galleries of holes therethrough which are aligned with one another along axes perpendicular to the face of the one mold cavity defining member to form the branches.

14. The injection molding apparatus according to claim 13 wherein the cross sections of the respective galleries of holes transverse the axes of the branches, vary from one plate to the other to vary the cross sections of the shank portions and the tip portions of the respective bristles formed therein.

15. The injection molding apparatus according to claim 1 wherein the annular walls of the branches have fluting symmetrically angularly spaced about the axes thereof between the face of the one mold cavity defining member and the first cross sectional planes of the branches transverse the axes thereof, to form ribs on the shank portions of the respective bristles formed therein.

* * * * *